March 17, 1959     H. A. TRELOAR ET AL     2,878,098
MEANS FOR PREVENTING EVAPORATION FROM
RESERVOIRS OR THE LIKE Filed July 23, 1957                                            2 Sheets-Sheet 1

March 17, 1959 H. A. TRELOAR ET AL 2,878,098
MEANS FOR PREVENTING EVAPORATION FROM
RESERVOIRS OR THE LIKE
Filed July 23, 1957 2 Sheets-Sheet 2
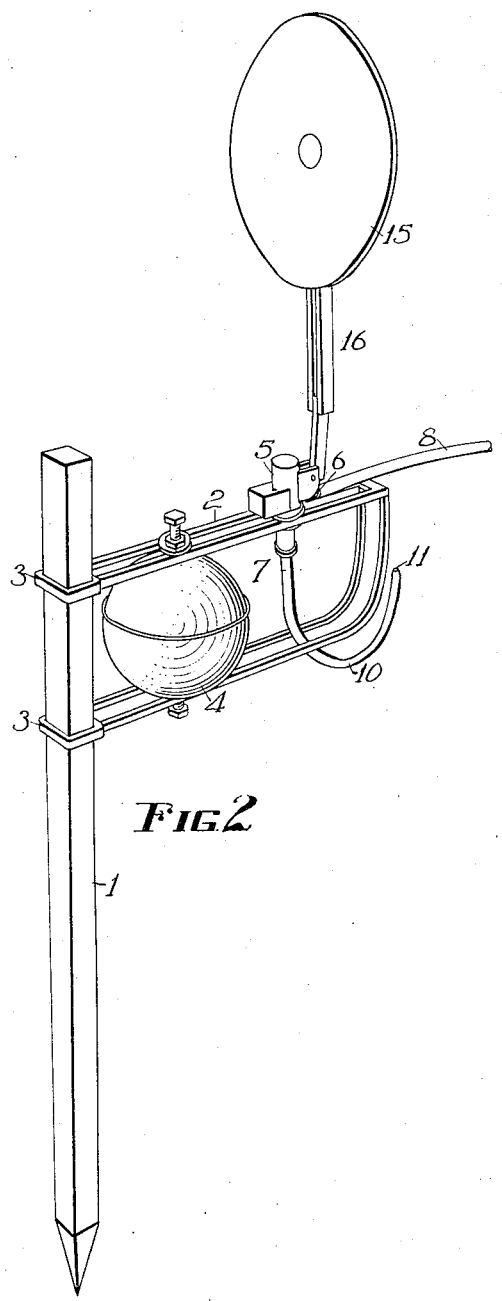
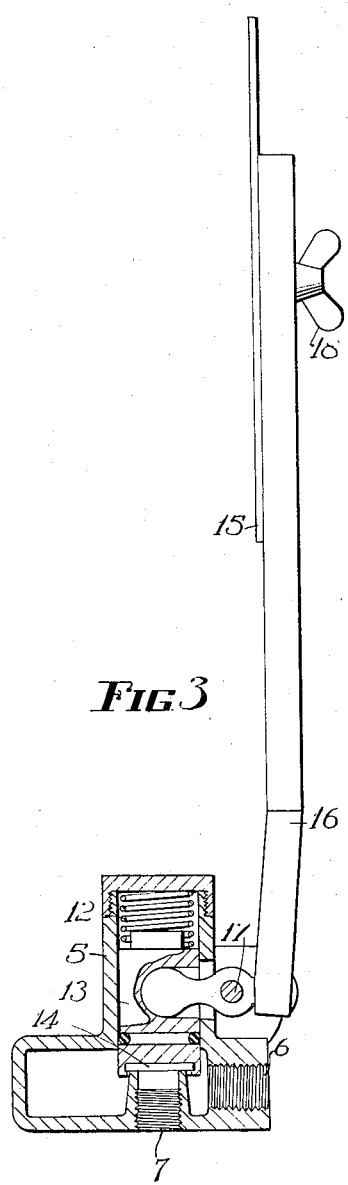

United States Patent Office 2,878,098
Patented Mar. 17, 1959

2,878,098

MEANS FOR PREVENTING EVAPORATION FROM RESERVOIRS OR THE LIKE

Howard Archibald Treloar, Mitcham, South Australia, and Jack Dunstan, Broken Hill, New South Wales, Australia Application July 23, 1957, Serial No. 673,722

Claims priority, application Australia July 23, 1956

9 Claims. (Cl. 21—61)

This invention relates to means for preventing or reducing evaporation from reservoirs or other open storage or flow means.

It has been estimated that in hotter climates the rate of evaporation causes loss from reservoirs or the like far in excess of the quantity used by consumers. In some areas only approximately one fifth of the stored water reaches the consumer, four fifths being lost by evaporation due to the action of the elements such as sun and winds.

The object of the present invention is to provide means whereby this evaporation can be retarded, this being achieved by covering the surface of the reservoir or the like with a thin coating of a protective substance such as cetyl alcohol or a similar substance which will form a thin tenacious film on the surface of the water and will thus prevent or retard evaporation of the water, the device for carrying this out comprising means which discharge regulated amounts of the protective substance or similar substance in liquid form below, into or on to the water, with particular attention to the locality of discharge so that the protective substance will be assisted to spread across the reservoir or the like by wind or current action which also control the discharge of the substance.

It will be known that large surfaces of water usually have considerable current flow at the surface due to wind and other action, while the reservoir itself may have continuous intake with some water being lost over spillways, and it is therefore necessary to carefully position the discharge means for the protective film-forming substance such as cetyl alcohol.

The main factor to be considered is wind which tends to drive the material on the surface of the water in the direction of movement of the wind, and according to our invention therefore dispensing units are anchored around the perimeter of the area to be protected or at strategic points and connected to supply means so that any particular ones can supply the film-forming substances which are to form the protective coating on the water at any specific time.

The discharge of the protective material is preferably under control of a wind vane which appropriately controls a discharge valve or other mechanism in proportion to wind force and direction and which regulates the flow at that area.

The size of the reservoir or area of water will naturally decide the quantity of liquid which has to be fed out through the units, but this can readily be controlled by the volume delivered and can be varied according to the amount of wind, so that for instance the feed could be actuated by wind vanes and on a windy day will thus deliver larger quantities than on a calm day, or alternatively where there is a stream effect in the reservoir the movement of the water can operate a water motor or the like to actuate pumps or gravitation feed so that again there is a definite relationship between the movement of the water and the quantity of protective liquid pumped on to its surface.

As cetyl alcohol, the substance most commonly used for this purpose is normally in solid form, it must be mixed with other agents such as volatile spirits or the like so that the volatile spirits after assisting in spreading the cetyl alcohol on the surface of the water readily evaporates and leaves a thin film or skin of cetyl alcohol on the surface of the water.

In order however that the invention may be more clearly understood, embodiments thereof will now be described with reference to the accompanying drawings in which:

Fig. 2 is a perspective view of one of the dispensing units arranged to be operated by a wind vane and controlling flow by means of a valve, Fig. 3 is a sectional side elevation of the valve mechanism.

Figure 1:
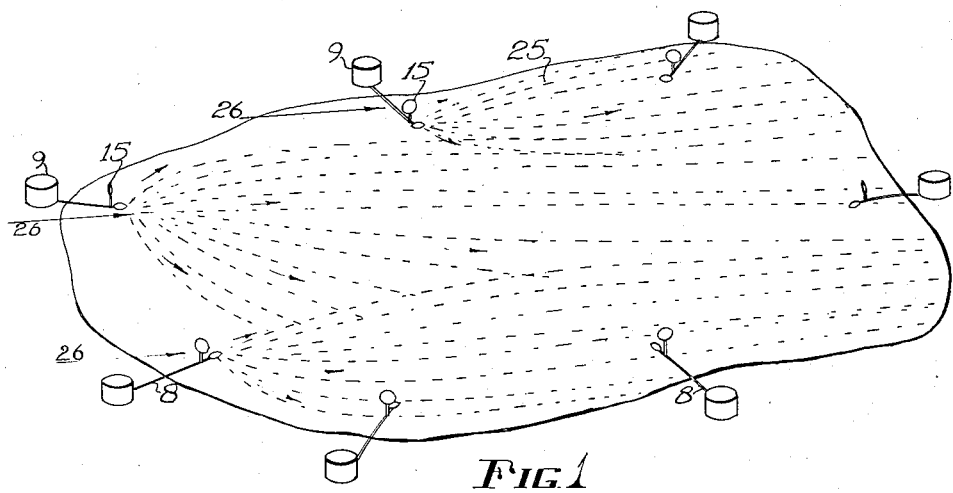
Fig. 1 shows an area of water protected according to this invention.

Describing first the device shown in Figs. 1, 2 and 3.

A post 1 of square cross-section is driven into the bank of the reservoir or the like to serve as an anchor.

Engaged on this post 1 is a frame 2 having a pair of collars 3 which are also of square shape so that the frame 2 can move up and down on the post 1, but cannot be rotated thereon. This ensures correct orientation of the device.

Supported by the frame 2 is a float 4 which maintains the frame 2 at a constant level in relation to the surface of the water.

Also supported by the frame 2 is a valve 5 which has an inlet 6 and outlet 7, the inlet 6 being connected by a flexible hose 8 to a supply tank, see 9 in Fig. 1. The outlet pipe 10 projects down to have an opening 11 just beneath the surface of the water.

The valve is normally closed by a spring 12 pressing on the plunger 13 to cause it to seat on the outlet 7, but this plunger 13 may be lifted to bring its sealing face 14 clear of the outlet 7 to allow a flow of liquid through same, the plunger being lifted when wind pressure on the vane 15, which is mounted on the arm 16 in turn pivoted to the valve by the pin 17, overcomes the pressure of the spring 12.

The vane 15 is adjustable on the arm 16 by a thumb screw 18 to regulate the wind leverage on the valve.

The type of valve can, of course, be substantially varied, and it has been found satisfactory to use an ordinary motor cycle carburetor with a wind vane arranged to operate on the usual priming pin.

Figure 4:
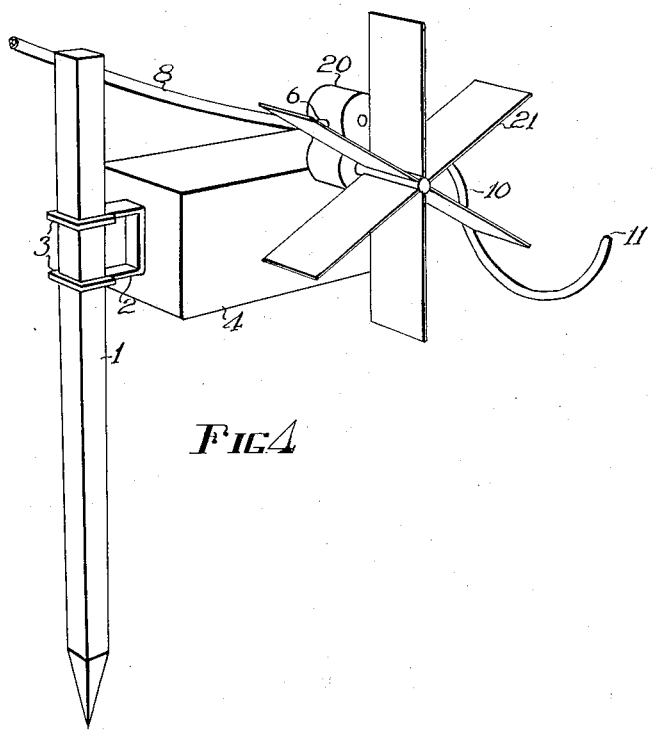
Fig. 4 is a view corresponding to Fig. 2 but showing a water-flow operated control device.

In the embodiment shown in Fig. 4 a post 1 has a frame 2 supported on it to be slidable, collars 3 being again used to maintain orientation.

A float 4 carries on it a small gear or other pump 20 driven by a water wheel 21 which is only partly submerged in use under influence of the float.

The inlet 6 is again coupled to a supply tank 9 by the hose 8, while the pipe 10 again has its opening 11 disposed just below the water level.

In Fig. 1 is shown how a series of units such as those shown in Figs. 2 and 3 can be arranged around a reservoir 25, the flow lines being indicated in relation to wind action in the direction of the arrows 26.

It will be clear, as the units cannot revolve about the posts 1, that by suitable arrangement only these on the windward side of the reservoir can be actuated to release the protective liquid, the wind either being ineffective on the others due to the angle of the vanes 15 or remaining closed because the wind is on the back of the vanes.

The unit shown in Fig. 4 is intended more for directional water flow, such as in streams or at a reservoir intake where it is desired to measure the inflow to make good the protective liquid lost in normal outflow over a weir or the like.

What we claim is:

1. A device for dispensing an evaporation preventing substance onto the exposed surface of a body of water; comprising means defining a passage through which an evaporation preventing substance can pass onto the exposed surface of a body of water, regulating means interposed in said passage for controlling the rate of flow of the evaporation preventing substance therethrough, and actuating means for said regulating means responding to the rate of flow of a fluid which influences the rate of evaporation of the water from the exposed surface thereof so that the rate of flow of the evaporation preventing substance through said passage is dependent upon said rate of flow of the fluid influencing the rate of evaporation.

2. A device for dispensing an evaporation preventing substance onto the exposed surface of a moving stream of water; comprising means defining a passage through which an evaporation preventing substance can pass onto the exposed surface of the stream of water, regulating means interposed in said passage to control the rate of flow of said substance therethrough, and actuating means for said regulating means responding to the rate of flow of water in the stream to control the rate of flow of the evaporation preventing substance in accordance with the rate of flow of the stream.

3. A device as in claim 2; wherein said regulating means is a pump interposed in said passage, and said actuating means is a water wheel immersed in the moving stream of water and operatively connected to said pump to drive the latter at a speed determined by the rate of flow of water in the stream.

4. A device for dispensing an evaporation preventing substance onto the exposed surface of a body of water; comprising means defining a passage through which an evaporation preventing substance can pass onto the exposed surface of the body of water, regulating means interposed in said passage to control the rate of flow of said substance therethrough, and actuating means for said regulating means responding to the velocity of the wind over said exposed surface to vary the rate of flow of the evaporation preventing substance in accordance with the wind velocity.

5. A device as in claim 4; wherein said regulating means is a valve interposed in said passage; and said actuating means includes a movable vane extending above the exposed surface of the body of water and subjected to the wind moving thereacross so that said vane is deflected in accordance with the wind velocity, and connecting means between said vane and said valve to operate the latter in accordance with the deflection of the vane.

6. A device for dispensing an evaporation preventing substance onto the exposed surface of a body of water; comprising a non-rotatable upstanding support adapted to be mounted at the bank of the body of water, a float movable vertically with respect to said non-rotatable support and adapted to be immersed in the body of water so that the vertical position of said float is determined by the level of the exposed surface of the body of water, a source of the evaporation preventing substance located on shore, conduit means leading from said source and terminating in a discharge section which is movable vertically with said float so that said discharge section opens at the exposed surface of the body of water to discharge the evaporation preventing substance thereon, flow control means interposed in said conduit means for regulating the flow of the evaporation preventing substance therethrough, and means to actuate said flow control means in response to the rate of flow in a selected direction of a fluid which influences the rate of evaporation of water from the exposed surface.

7. A device as in claim 6; wherein a frame is vertically slidable on, and non-rotatable with respect to, said non-rotatable support, and said float and flow control means are both mounted on said frame.

8. A device as in claim 7; wherein said flow control means is a valve interposed in said conduit means, and said means to actuate the flow control means includes yieldable means tending to close said valve and a vane mounted movably and connected to said valve so that wind passing over the exposed surface of the body of water in said selected direction acts against said vane to move the latter in the direction for opening said valve.

9. A device as in claim 7; wherein said flow control means is a pump interposed in said conduit means, and said means to actuate the flow control means is a rotatable water wheel connected to said pump to drive the latter and arranged with respect to said frame to dip into the body of water so that flow of the latter in the direction away from the device serves to operate said pump.

References Cited in the file of this patent

UNITED STATES PATENTS

| 1,323,800 | Walker | Dec. 2, 1919 |
| 1,747,377 | Maxon | Feb. 18, 1930 |
| 2,733,957 | Vanburen | Feb. 7, 1956 |